US008209939B2

(12) United States Patent
Anast et al.

(10) Patent No.: US 8,209,939 B2
(45) Date of Patent: Jul. 3, 2012

(54) SYSTEM AND METHOD FOR SUPPORTING A LOAD ACROSS A PLURALITY OF NON-INTERSECTING BEAMS

(75) Inventors: Peter Z. Anast, Sammamish, WA (US); Rickie Hansken, Marysville, WA (US)

(73) Assignee: The Boeing Company, Chicago, IL (US)

( * ) Notice: Subject to any disclaimer, the term of this patent is extended or adjusted under 35 U.S.C. 154(b) by 56 days.

(21) Appl. No.: 12/854,731

(22) Filed: Aug. 11, 2010

(65) Prior Publication Data

US 2012/0036809 A1 Feb. 16, 2012

(51) Int. Cl.
*E04C 3/00* (2006.01)

(52) U.S. Cl. ........................ 52/838; 244/118.1

(58) Field of Classification Search .............. 52/838, 52/483.1, 653.1; 244/118.1, 118.5, 117 R
See application file for complete search history.

(56) References Cited

U.S. PATENT DOCUMENTS

| | | | |
|---|---|---|---|
| 3,912,206 A * | 10/1975 | Jong | 248/615 |
| 6,199,341 B1 * | 3/2001 | Carlin et al. | 52/653.1 |
| 6,554,225 B1 * | 4/2003 | Anast et al. | 244/117 R |
| 7,370,832 B2 | 5/2008 | Frantz et al. | |
| 7,413,143 B2 | 8/2008 | Frantz et al. | |
| 7,506,855 B2 | 3/2009 | Frantz et al. | |
| 7,607,613 B2 | 10/2009 | Frantz et al. | |
| 2010/0230544 A1 * | 9/2010 | Huber et al. | 244/131 |
| 2010/0243803 A1 | 9/2010 | Westre et al. | |

FOREIGN PATENT DOCUMENTS

| | | | |
|---|---|---|---|
| DE | 3141869 A1 | 5/1983 | |
| DE | 102009012428 A1 * | 9/2010 | |
| EP | 2179920 A2 | 4/2010 | |
| FR | 2900125 A1 | 10/2007 | |

OTHER PUBLICATIONS

PCT International Search Report; re: PCT10-0277WOPCT filed Jul. 7, 2011; search mailed Nov. 30, 2011.

* cited by examiner

*Primary Examiner* — Brian Glessner
*Assistant Examiner* — Paola Agudelo
(74) *Attorney, Agent, or Firm* — Law Office of Donald D. Mondul

(57) ABSTRACT

A system for supporting a load across non-intersecting beams each having a web depending from an upper chord with an upper surface generally parallel with a chordal plane includes at least one crossing member intersecting the beams at intersection loci. At each intersection locus the beam presents a channel receiving a crossing member in a nesting orientation in an installed orientation. The crossing member includes a support expanse configured for an abutting relation with the upper chord to present the upper surface and a top surface of the crossing member as coplanar in the installed orientation. The beam and the crossing member have aperture-pairs in register in the installed orientation. The apertures accommodate tension resisting members or compression resisting members coupled with the upper chord and traversing the crossing member for resisting tension or compression forces on the upper chord in the installed orientation.

19 Claims, 5 Drawing Sheets

SYSTEM AND METHOD FOR SUPPORTING A LOAD ACROSS A PLURALITY OF NON-INTERSECTING BEAMS

TECHNICAL FIELD

The present invention is directed to supporting a load across a plurality of non-intersecting beams, and especially to supporting passenger or cargo loads across lateral or athwartship beams in an aircraft.

BACKGROUND

Load bearing structures for cooperating with lateral or athwartship beams may be encountered, by way of example and not by way of limitation, in aircraft for supporting passenger seating or cargo. Changes in various aspects of aircraft design may require redesign of load bearing structures to accommodate changes in such parameters as, by way of example and not by way of limitation, overhead clearance above the load bearing structure, load capacity, varied pitch or spacing between lateral beams, seat or cargo fixtures or other parameters.

There is a need for a system and method for supporting a load across a plurality of non-intersecting beams, such as lateral or athwartship beams, that can support increased loads with acceptable overhead clearance in cooperation with lateral beams having increased pitch.

SUMMARY

A system for supporting a load across non-intersecting beams each having a web depending from an upper chord with an upper surface generally parallel with a chordal plane includes at least one crossing member intersecting the beams at intersection loci. At each intersection locus the beam presents a channel receiving a crossing member in a nesting orientation in an installed orientation. The crossing member includes a support expanse configured for an abutting relation with the upper chord to present the upper surface and a top surface of the crossing member as coplanar in the installed orientation. The beam and the crossing member have aperture-pairs in register in the installed orientation. The apertures accommodate tension resisting members or compression resisting members coupled with the upper chord and traversing the crossing member for resisting tension or compression forces on the upper chord in the installed orientation.

A method for supporting a load across a plurality of non-intersecting beams; each respective beam of the plurality of non-intersecting beams having a web depending from an upper chord; the upper chord presenting an upper surface generally parallel with a chordal plane; the method comprising: (a) providing at least one crossing member intersecting the plurality of non-intersecting beams at a plurality of intersection loci; (b) providing a channel structure in the respective non-intersecting beam at each respective intersection locus of the plurality of intersection loci; the channel structure being configured for receiving a respective crossing member of the at least one crossing member in a substantially nesting orientation when the respective non-intersecting beam and the respective crossing member are in an installed orientation; (c) providing an integral support expanse with each the respective crossing member; the integral support expanse being configured for a substantially nestingly abutting relation with the upper chord to present the upper surface of the respective non-intersecting beam and a top surface of the respective crossing member in a substantially coplanar relation in the installed orientation; and (d) providing a plurality of aperture-pairs in the respective non-intersecting beam and the respective crossing member; the plurality of aperture-pairs being substantial register in the installed orientation; each respective aperture-pair of the plurality of aperture-pairs being oriented about a respective axis generally parallel with the chordal plane; the plurality of apertures accommodating at least one tension resisting member coupled with the upper chord and traversing the respective crossing member for resisting tension forces on the upper chord in the installed orientation; the plurality of apertures accommodating at least one compression resisting member coupled with the upper chord and traversing the respective crossing member within the channel structure for resisting compression forces on the upper chord in the installed orientation.

It is, therefore, a feature of the present disclosure to provide a system and method for supporting a load across a plurality of non-intersecting beams, such as lateral or athwartship beams, which can support increased loads with acceptable overhead clearance in cooperation with lateral beams having increased pitch.

Further objects and features of the present disclosure will be apparent from the following specification and claims when considered in connection with the accompanying drawings, in which like elements are labeled using like reference numerals in the various figures, illustrating the preferred embodiments of the disclosure.

DETAILED DESCRIPTION

Figure 1:
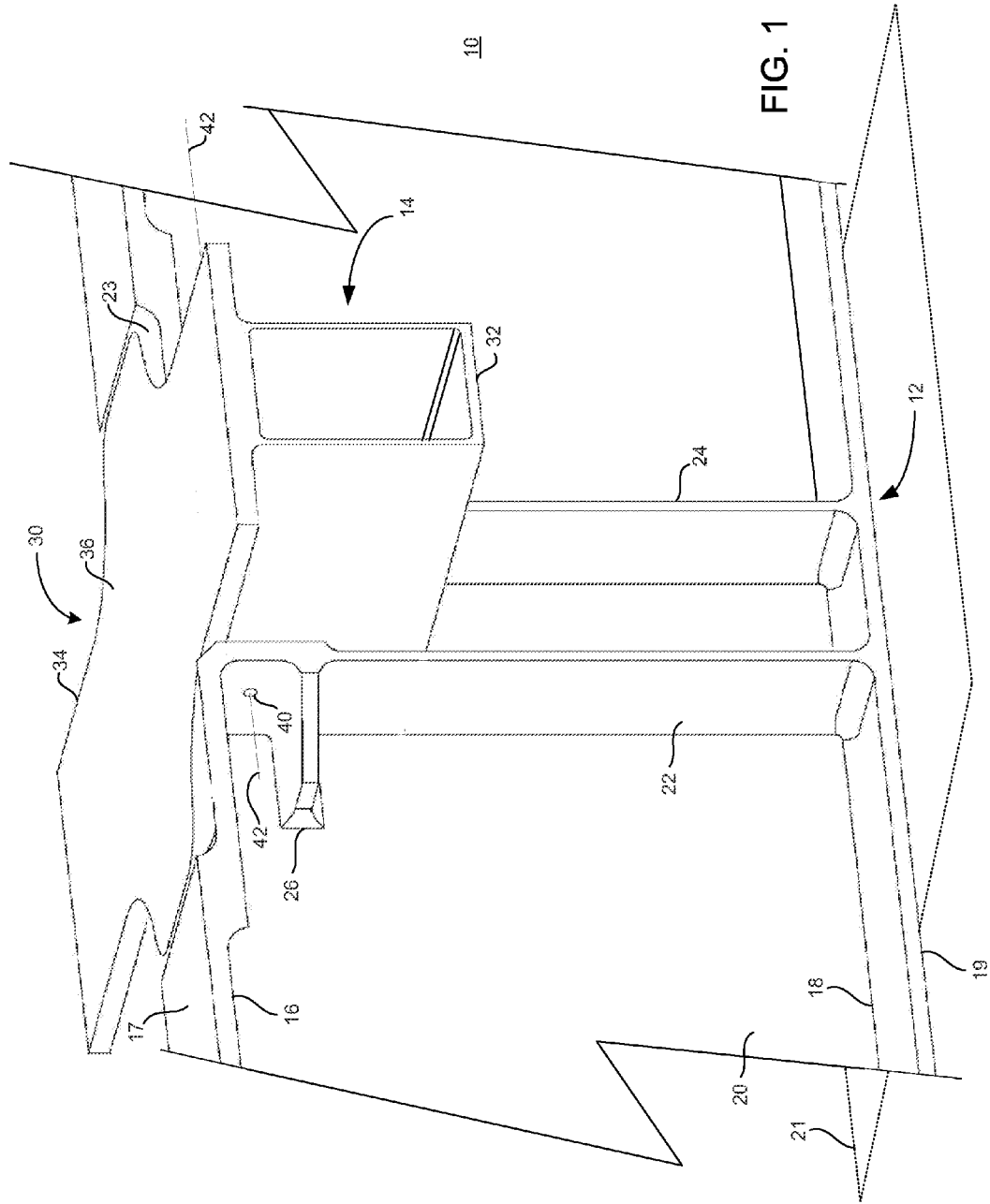
FIG. 1 is a perspective view of a portion of a load supporting beam substantially in an installed orientation with a lateral beam.

FIG. 1 is a perspective view of a portion of a load supporting beam substantially in an installed orientation with a lateral beam. In FIG. 1, a load supporting system 10 may be illustrated in substantially an installed orientation having a crossing member 30 intersecting a lateral beam 12 at an intersection locus 14.

Lateral beam 12 may be one of a plurality of non-intersecting beams (plurality of lateral beams is not shown in FIG. 1; understood by those skilled in the art of load bearing structure design) which may be arranged in a substantially parallel orientation. An example of non-intersecting beams is disclosed in U.S. Pat. No. 6,554,225 to Anast et al., which is assigned to the assignee of the present disclosure.

Lateral beam 12 may have an upper chord 16 and a lower chord 18 joined by an integral web 20. Upper chord 16 may have an upper surface 17. Lower chord 18 may have a lower surface 19. Surfaces 17, 19 may be substantially parallel with a chordal plane 21. Ribs 22, 24 may be integrally formed with web 20 and chords 16, 18 to provide additional strength to lateral beam 12, especially in the vicinity of intersection locus 14. Buttresses 26, 28 (only one buttress 26 is visible in FIG. 1) may provide additional support for ribs 22, 24 in the vicinity of intersection locus 14.

Crossing member 30 may present a generally hollow channel member 32 depending from an integral support expanse 34. Channel member 32 may present any shape in cross-section including, by way of example and not by way of limitation, a U-shape, an oval shape, a circular shape, a square shape, an X-shape, a Z-shape or another shape. In FIG. 1, channel member 32 is illustrated presenting a rectangular shape in cross section. Channel member 32 may be generally nestingly received within a channel receiving structure 33 presented by lateral beam 12 (not visible in FIG. 1, see FIGS. 2 and 3). Support expanse 34 may abut upper chord 16 in a substantially nesting relation within a recess 23 in upper surface 17. Support expanse 34 may cooperate with recess 23 to present an upper surface 36 in substantially coplanar relation with upper surface 17 when support expanse 34 is in an installed orientation with lateral beam 12.

Lateral beam 12 and crossing member 30 may present aperture-pairs 40 (only one aperture of an aperture-pair 40 is visible in FIG. 1). One aperture of an aperture-pair 40 (e.g., the aperture visible in FIG. 1) may traverse a rib 22, 24. Another aperture of an aperture-pair 40 may traverse channel member 32 or crossing member 30. Aperture-pairs 40 may be in substantial register substantially oriented about an axis 42 in an installed orientation. Aperture-pairs 40 may each accommodate a respective tension resisting member extending between two adjacent ribs 22, 24 and traversing crossing member 30 for resisting tension forces on upper chord 16 in an installed orientation. This relation is not readily visible in FIG. 1, and will be described in greater detail with respect to FIGS. 2 and 3.

Aperture-pairs 40 may each accommodate a respective compression resisting member extending between two adjacent ribs 22, 24 and traversing crossing member 30 for resisting compression forces on upper chord 16 in an installed orientation. This relation is not readily visible in FIG. 1, and will be described in greater detail with respect to FIGS. 2 and 3.

Figure 2:
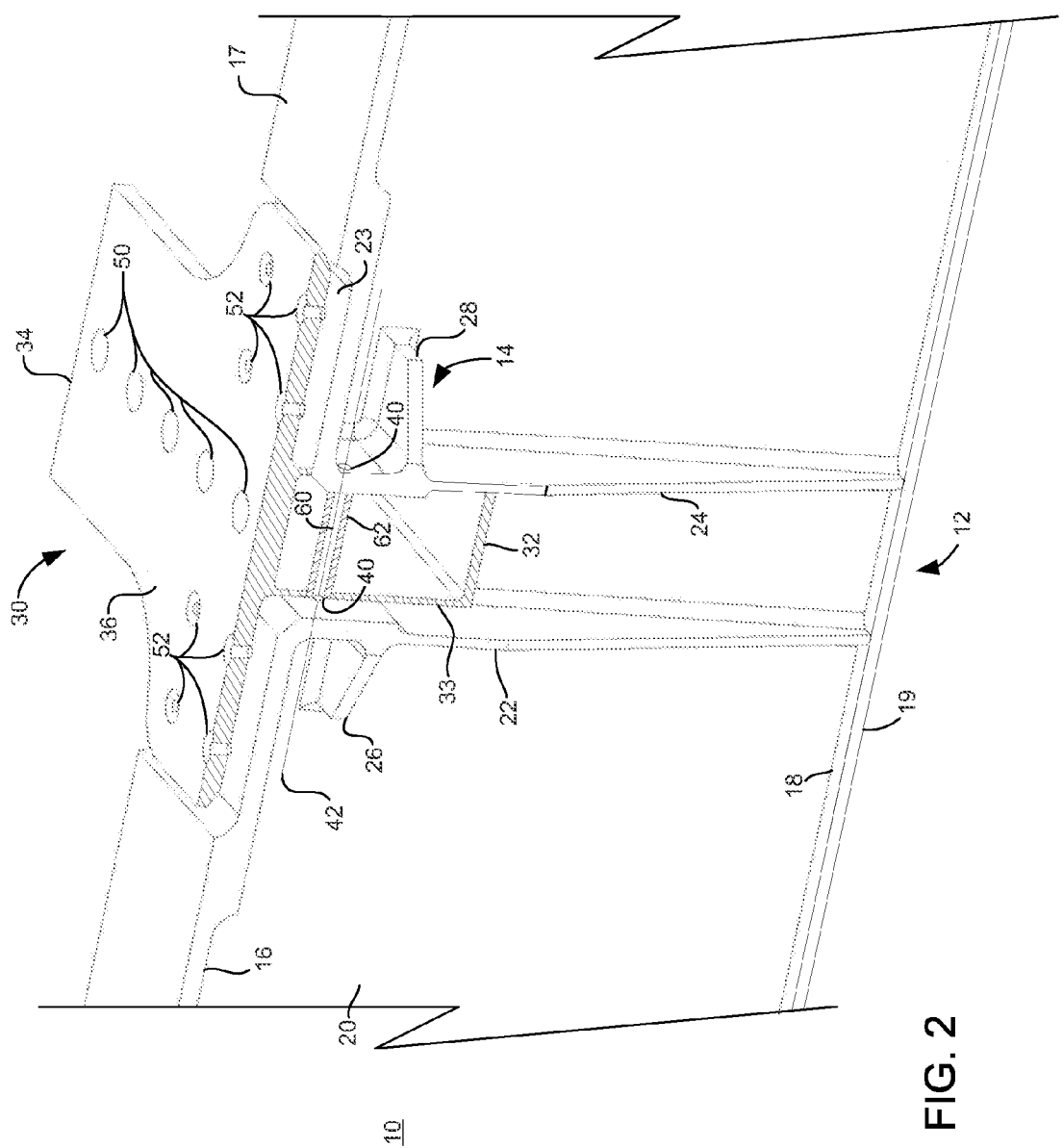
FIG. 2 is a perspective sectioned view of a portion of a load supporting beam substantially in an installed orientation with a lateral beam.

FIG. 2 is a perspective sectioned view of a portion of a load supporting beam substantially in an installed orientation with a lateral beam. In FIG. 2, load supporting system 10 may be illustrated in substantially an installed orientation having crossing member 30 intersecting lateral beam 12 at intersection locus 14.

Lateral beam 12 may be one of a plurality of non-intersecting beams (plurality of beams not shown in FIG. 1; understood by those skilled in the art of load bearing structure design) which may be arranged in a substantially parallel orientation. An example of non-intersecting beams is disclosed in U.S. Pat. No. 6,554,225 to Anast et al., which is assigned to the assignee of the present disclosure.

Lateral beam 12 may have upper chord 16 and lower chord 18 joined by an integral web 20. Upper chord 16 may have an upper surface 17. Lower chord 18 may have a lower surface 19. Surfaces 17, 19 may be substantially parallel with a chordal plane 21 (FIG. 1). Ribs 22, 24 may be integrally formed with web 20 and chords 16, 18 to provide additional strength to lateral beam 12, especially in the vicinity of intersection locus 14. Buttresses 26, 28 may be provided to provide additional support for ribs 22, 24 in the vicinity of intersection locus 14.

Crossing member 30 may present a generally hollow channel member 32 depending from an integral support expanse 34. Channel member 32 may present any shape in cross-section including, by way of example and not by way of limitation, a U-shape, an oval shape, a circular shape, a square shape, an X-shape, a Z-shape or another shape. In FIG. 2, channel member 32 is illustrated presenting a rectangular shape in cross section. Channel member 32 may be generally nestingly received within a channel receiving structure 33 presented by lateral beam 12. Support expanse 34 may abut upper chord 16 in a substantially nesting relation within a recess 23 in upper surface 17. Support expanse 34 may cooperate with recess 23 to present an upper surface 36 in substantially coplanar relation with upper surface 17 when support expanse 34 is in an installed orientation with lateral beam 12.

Support expanse 34 may include apertures 50 for accommodating seating or cargo securing fixtures (not shown in FIG. 2; understood by those skilled in the art of designing seating and cargo securing fixtures). Support expanse 34 may also include apertures 52 for accommodating mounting elements (not shown in FIG. 2, understood by those skilled in the art of beam intersection design) such as, by way of example and not by way of limitation, threaded fasteners for threaded engagement with upper chord 16 through apertures 52. Mounting elements such as threaded fasteners engaging upper chord 16 through apertures 52 may operate as shear resisting members to provide resistance to shear forces that may be experienced by crossing member 30 with respect to lateral beam 12. Other mounting elements than threaded fasteners may include, by way of example and not by way of limitation, pins, posts, rivets or other elements traversing apertures 52 and engaging upper chord 16. Engagement of mounting elements with upper chord 16 may be effected, by way of further example and not by way of limitation, using press fitting, adhesive, soldering, welding or another affixing technique.

Lateral beam 12 and crossing member 30 may present aperture-pairs 40. One aperture of an aperture-pair 40 may traverse a rib 22, 24. Another aperture of an aperture-pair 40 may traverse channel member 32 of crossing member 30. Aperture-pairs 40 may be in substantial register substantially oriented about an axis 42 in an installed orientation.

Aperture-pairs 40 may each accommodate a respective tension resisting member extending between two adjacent ribs 22, 24 and traversing crossing member 30 for resisting tension forces on upper chord 16 in an installed orientation. A tension resisting member may be embodied, by way of example and not by way of limitation, in a pin 60 or similarly configured member in an engaged relation with ribs 22, 24 to resist movement of ribs 22, 24 further apart in response to forces exerted on load supporting system 10. Affixing of pin 60 with ribs 22, 24 may be effected, by way of example and not by way of limitation, using press fitting, adhesive, soldering, welding, or another affixing technique. By way of further example and not by way of limitation, a pin 60 traversing aperture-pairs 40 in each of ribs 22, 24 and presenting a threaded portion extending past at least one rib 22, 24 away from the other rib 22, 24 with a nut (or nut and washer) affixed to each threaded element may provide the desired tension-resisting relation between pin 60 and ribs 22, 24. One end of a threaded element may be provided with a head having a diameter greater than the diameter of aperture-pair 40.

Aperture-pairs 40 may each accommodate a respective compression resisting member extending between two adjacent ribs 22, 24 and traversing crossing member 30 for resisting compression forces on upper chord 16 in an installed orientation. A compression resisting member may be embodied, by way of example and not by way of limitation, in a rod 62 or similarly configured member in an engaged relation with ribs 22, 24 to resist movement of ribs 22, 24 closer together in response to forces exerted on load supporting system 10. Affixing of rod 62 with ribs 22, 24 may be effected, by way of example and not by way of limitation, using press fitting, adhesive, soldering, welding, or another affixing technique. By way of further example and not by way of limitation, rod 62 may be configured as a hollow rod generally surrounding aperture-pairs 40. A hollow configuration of rod 62 may accommodate a pin 60 to arrange rod 62 and pin 60 substantially coaxially about axis 42, generally as illustrated in FIGS. 2 and 3.

Alternatively, as illustrated in FIG. 2, an aperture of an aperture-pair 40 that traverses a buttress 22, 24 may be smaller than yet substantially coaxial with an aperture of the aperture-pair 40 that traverses channel member 32. In such an arrangement, rod 62 may traverse channel member 32 to bear against a buttress 22, 24 and thereby still fulfill a compression resisting purpose. Pin 60 may still be situated coaxially within a hollow rod 60 to perform tension resisting, as previously described. Rod 60 may fit snugly or loosely within the apertures traversing channel member 32. Pin 60 may traverse rod 60 and snugly or loosely fit within apertures of aperture-pairs 40 that traverse a buttress 22, 24. Pin 60 may be configured as a threaded bolt having a head diameter larger than the diameter of an aperture traversing a buttress 22, 24 and a nut (or nut and washer) having a diameter larger than the diameter of another aperture traversing a buttress 22, 24.

Figure 3:
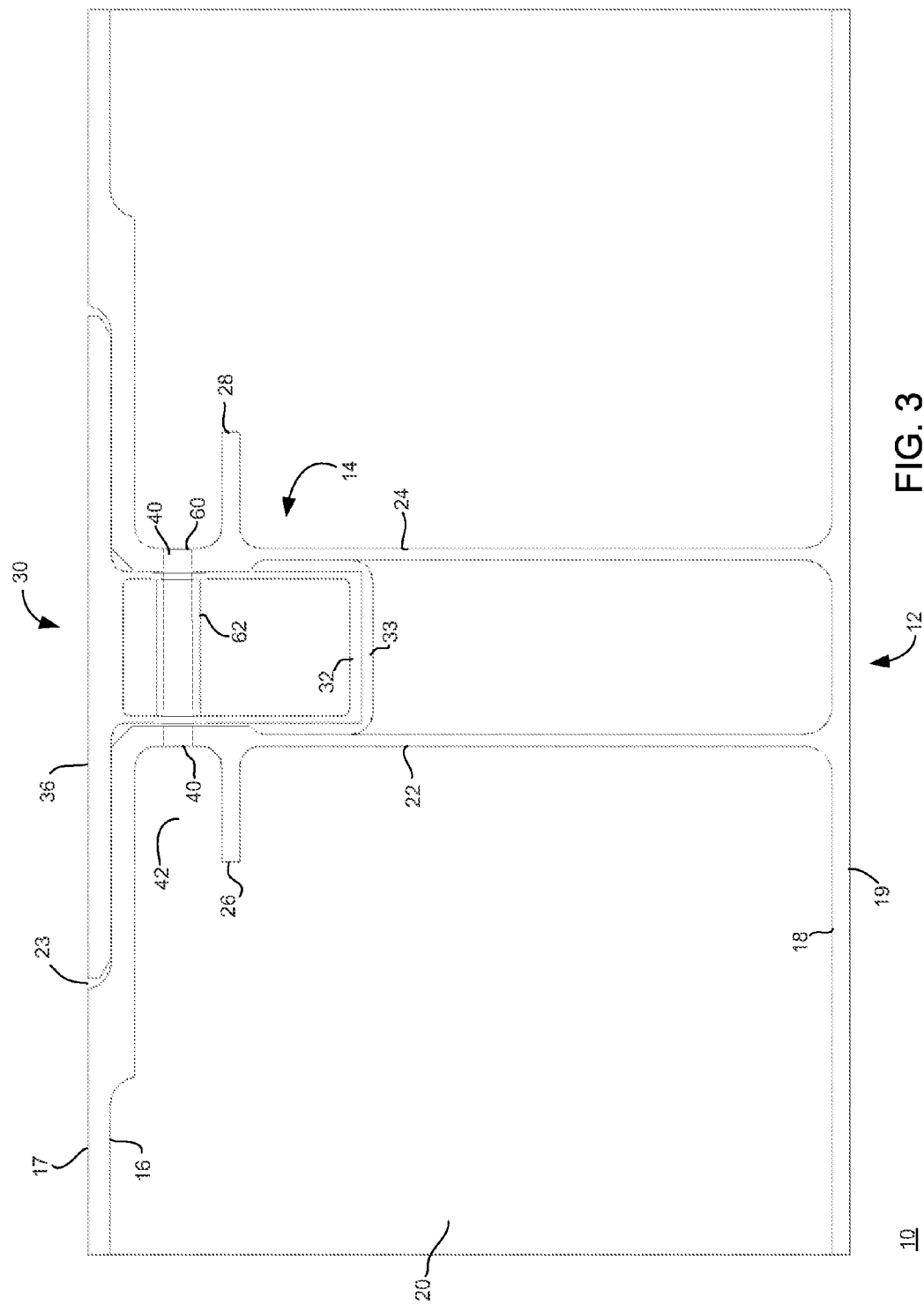
FIG. 3 is an elevation view of a section of a load supporting beam substantially in an installed orientation with a lateral beam.

FIG. 3 is an elevation view of a section of a load supporting beam substantially in an installed orientation with a lateral beam. In FIG. 3, load supporting system 10 may be illustrated in substantially an installed orientation having crossing member 30 intersecting lateral beam 12 at intersection locus 14 substantially as described in connection with FIGS. 1 and 2. In order to avoid prolixity, the description will not be repeated here in its entirety.

Of particular interest in FIG. 3 is a clear illustration of the relationship between a tension resisting member (embodied in a pin 60) and a compression resisting member (embodied in a hollow rod 62) arranged substantially coaxially with respect to axis 42. Also, in FIG. 3, one may observe that channel member 32 is in generally spaced relation with respect to ribs 22, 24 and web 20 at intersection locus 14 in an installed orientation. Such a spaced relation may be preferred to reduce opportunities to add to tensile, compression or shear forces experienced by load supporting system 10 in an installed orientation.

Figure 4:
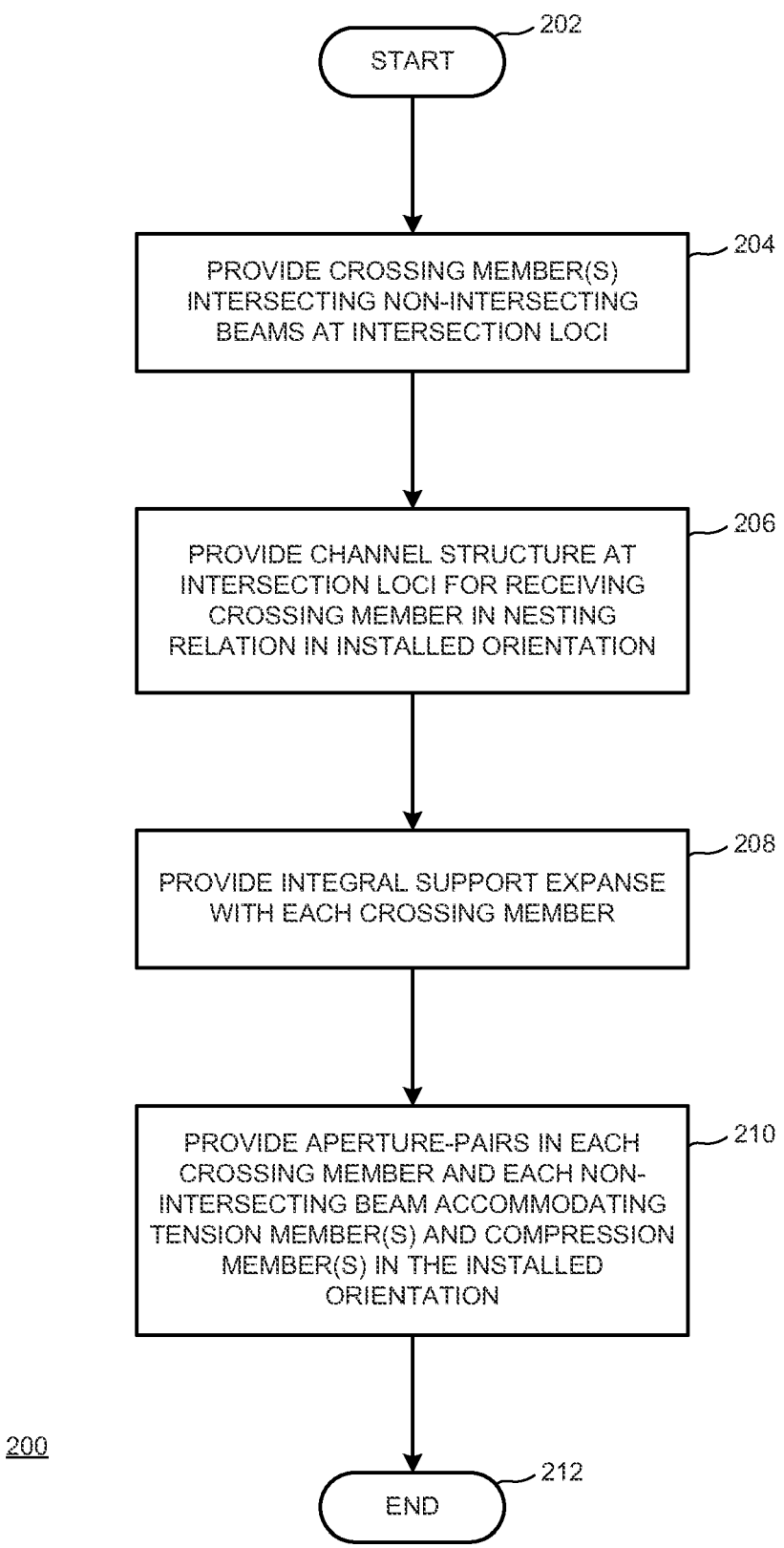
FIG. 4 is a flowchart illustrating the method of the present disclosure.

FIG. 4 is a flowchart illustrating the method of the present disclosure. In FIG. 4, a method 200 for supporting a load across a plurality of non-intersecting beams may begin at a START locus 202. Each respective beam of the plurality of non-intersecting beams has a web depending from an upper chord. The upper chord presents an upper surface generally parallel with a chordal plane.

Method 200 may continue with providing at least one crossing member intersecting the plurality of non-intersecting beams at a plurality of intersection loci, as indicated at a block 204.

Method 200 may continue with providing a channel structure in a respective non-intersecting beam at each respective intersection locus of the plurality of intersection loci, as indicated at a block 206. The channel structure may be configured for receiving a respective crossing member of the at least one crossing member in a substantially nesting orientation when the respective non-intersecting beam and the respective crossing member are in an installed orientation.

Method 200 may continue with providing an integral support expanse with each respective crossing member, as indicated at a block 208. The integral support expanse may be configured for a substantially nestingly abutting relation with the upper chord to present the upper surface of the respective non-intersecting beam and a top surface of the respective crossing member in a substantially coplanar relation in the installed orientation.

Method 200 may continue with providing a plurality of aperture-pairs in the respective non-intersecting beam and the respective crossing member, as indicated at a block 210. The plurality of aperture-pairs may be in substantial register in the installed orientation. Each respective aperture-pair of the plurality of aperture-pairs may be oriented about a respective axis generally parallel with the chordal plane.

The plurality of apertures may accommodate at least one tension resisting member coupled with the upper chord and traversing the respective crossing member for resisting tension forces on the upper chord in the installed orientation. The plurality of apertures may accommodate at least one compression resisting member coupled with the upper chord and traversing the respective crossing member within the channel structure for resisting compression forces on the upper chord in the installed orientation.

Method 200 may terminate at an END locus 212.

Figure 5:
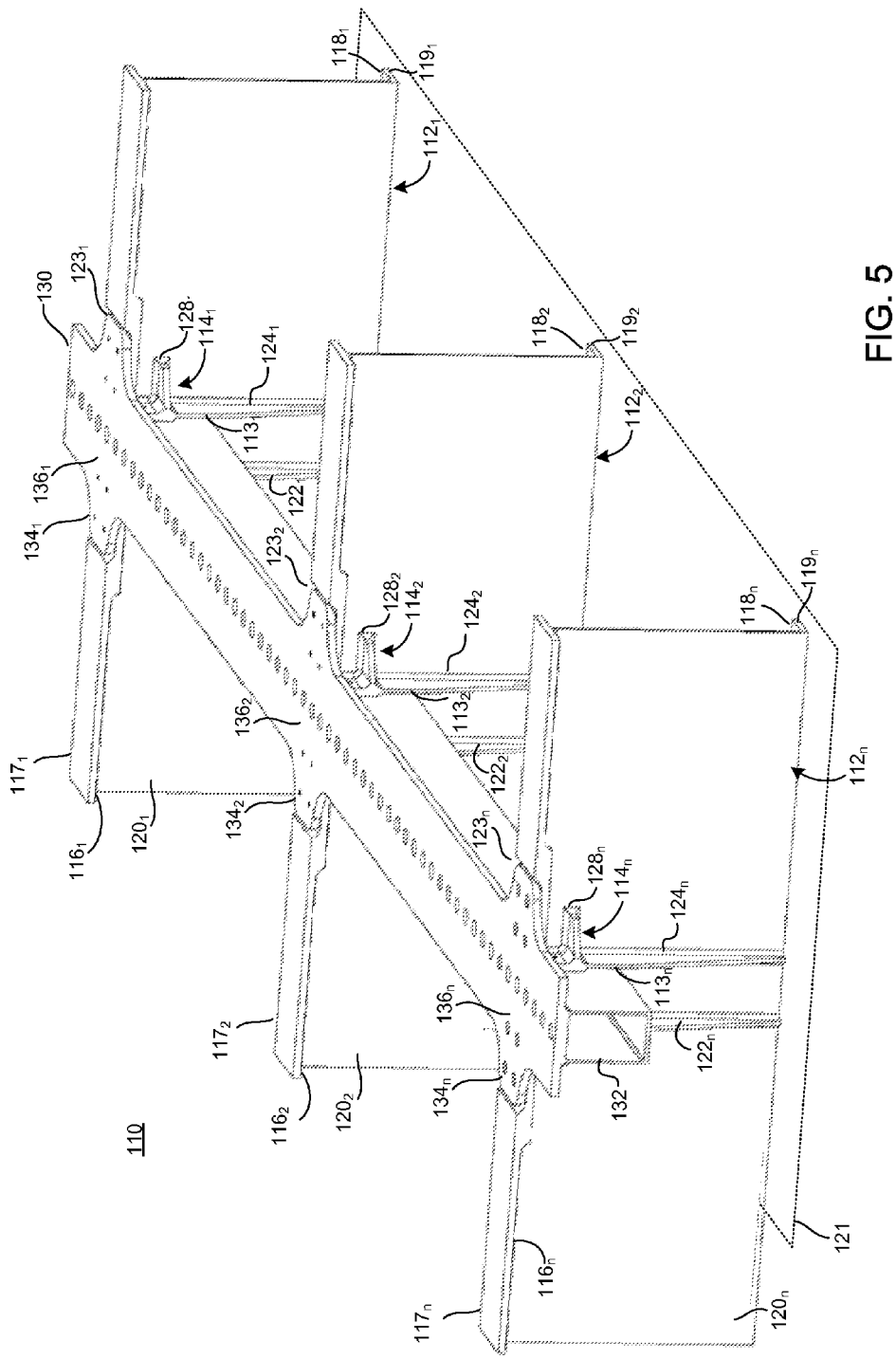
FIG. 5 is a perspective view of a portion of a load supporting beam substantially in an installed orientation with a plurality of lateral beams.

FIG. 5 is a perspective view of a portion of a load supporting beam substantially in an installed orientation with a plurality of lateral beams. In FIG. 5, a load supporting system 110 may be illustrated in substantially an installed orientation having a crossing member 130 intersecting lateral beams $112_1$, $112_2$, $112_n$ at intersection loci $114_1$, $114_2$, $114_n$.

The indicator "n" is employed to signify that there can be any number of lateral beams in load supporting system 110. The inclusion of three lateral beams $112_1$, $112_2$, $112_n$ in FIG. 5 is illustrative only and does not constitute any limitation regarding the number of lateral beams that may be included in the load supporting system of the present disclosure. Elements associated with a respective lateral beam $112_1$, $112_2$, $112_n$ are indicated using similar subscripts as the respective lateral beam.

Throughout this description, use of a reference numeral using a generic subscript herein may be taken to mean that any respective member of the plurality of elements having the same reference numeral may be regarded as included in the description. Thus, by way of example and not by way of limitation, referring to intersection locus $114_n$ in describing FIG. 5 may be taken to mean that any intersection locus—$114_1$, $114_2$ or $114_n$ (FIG. 5)—may be regarded as capable of employment as described.

Crossing member 130 may be one of a plurality of crossing members (plurality of crossing members is not shown in FIG. 5; understood by those skilled in the art of load bearing structure design) which may be arranged in a substantially parallel orientation.

A respective lateral beam $112_n$ may have an upper chord $116_n$ and a lower chord $118_n$ joined by an integral web $120_n$. Upper chord $116_n$ may have an upper surface $117_n$. Lower chord $118_n$ may have a lower surface $119_n$. Surfaces $117_n$, $119_n$ may be substantially parallel with a chordal plane 121. Ribs $122_n$, $124_n$ may be integrally formed with web $120_n$ and chords $116_n$, $118_n$ to provide additional strength to lateral beam $112_n$, especially in the vicinity of intersection locus $114_n$. Buttresses $126_n$, $128_n$ (only one buttress $128_n$ is visible in FIG. 5) may provide additional support for ribs $122_n$, $124_n$ in the vicinity of intersection locus $114_n$.

Crossing member 130 may present a generally hollow channel member 132 depending from an integral support expanse $134_n$; preferably there is a respective integral support expanse $134_n$ oriented for association with each lateral beam $112_n$. Channel member 132 may present any shape in cross-section including, by way of example and not by way of limitation, a U-shape, an oval shape, a circular shape, a square shape, an X-shape, a Z-shape or another shape. In FIG. 5, channel member 132 is illustrated presenting a rectangular shape in cross section. Channel member 132 may be generally nestingly received within a channel receiving structure $133_n$ presented by each respective lateral beam $112_n$. Support expanse $134_n$ may abut upper chord $116_n$ in a substantially nesting relation within a recess $123_n$ in upper surface $117_n$. Support expanse $134_n$ may cooperate with recess $123_n$ to present an upper surface $136_n$ in substantially coplanar relation with upper surface $117_n$ when support expanse $134_n$ is in an installed orientation with lateral beam $112_n$ Lateral beam $112_n$ and crossing member 130 may present aperture-pairs for accommodating tension resisting members, or for accommodating compression resisting members or for accommodating both tension resisting members and compression resisting members substantially as described in connection with FIGS. 1, 2 and 3. Aperture pairs have not been included in FIG. 5 in order to avoid unnecessarily cluttering FIG. 5.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which may be defined by the following claims:

We claim:

1. A system for supporting a load across a plurality of non-intersecting beams; each respective beam of said plurality of non-intersecting beams having a web depending from an upper chord and a plurality of ribs extending generally perpendicular from said web integrally coupling said web with said upper chord; said upper chord being generally parallel with a chordal plane; the system comprising:

at least one crossing member; each respective crossing member of said at least one crossing member intersecting a selected non-intersecting beam of said plurality of non-intersecting beams at at least one respective intersection locus; each said respective crossing member having a length and a width; each said respective crossing member presenting a substantially planar upper surface substantially along said length and said width;

at each said respective intersection locus said respective non-intersecting beam presenting a channel structure configured for receiving said respective crossing member in a substantially nesting orientation when said respective non-intersecting beam and said respective crossing member are in an installed orientation;

said respective crossing member including an integral support expanse configured for a substantially nestingly abutting relation with said upper chord; said respective crossing member and said upper chord being substantially coplanar at said upper surface at each said respective intersection locus in said installed orientation;

at least one tension resisting member extending between two adjacent ribs of said plurality of ribs for resisting tension forces on said upper chord in said installed orientation.

2. The system for supporting a load across a plurality of non-intersecting beams as recited in claim 1 wherein said substantially abutting relation orients said upper chord to present a top surface of said respective non-intersecting beam and a top surface of said respective crossing member in a substantially coplanar relation in said installed orientation.

3. The system for supporting a load across a plurality of non-intersecting beams as recited in claim 1 wherein said respective non-intersecting beam and said respective crossing member have a plurality of aperture-pairs in substantial register in said installed orientation; each respective aperture-pair of said plurality of aperture-pairs being oriented about a respective aperture axis generally parallel with said chordal plane.

4. The system for supporting a load across a plurality of non-intersecting beams as recited in claim 3 wherein said plurality of aperture-pairs accommodates at least one compression resisting member extending between said two adjacent ribs and traversing said respective crossing member within said channel structure for resisting compression forces on said upper chord in said installed orientation.

5. The system for supporting a load across a plurality of non-intersecting beams as recited in claim 1 wherein the system further comprises a plurality of shear resisting members coupling said respective crossing member with said respective non-intersecting beam through said integral support expanse in said installed orientation.

6. The system for supporting a load across a plurality of non-intersecting beams as recited in claim 4 wherein at least one selected tension resisting member of said at least one tension resisting member is situated substantially coaxially with a respective compression resisting member of said at least one compression resisting member and substantially coaxially with a respective said aperture axis in said installed orientation.

7. The system for supporting a load across a plurality of non-intersecting beams as recited in claim 1 wherein each said respective crossing member includes a substantially rectangular structure depending from said integral support expanse; said substantially rectangular structure effecting said substantially nesting orientation with said channel structure.

8. The system for supporting a load across a plurality of non-intersecting beams as recited in claim 7 wherein each said respective crossing member has a respective length and wherein a dimension from said top surface of a respective crossing member to the opposing bottom limit of said substantially rectangular structure is substantially constant along said respective length.

9. The system for supporting a load across a plurality of non-intersecting beams as recited in claim 6 wherein at least one selected tension resisting member of said at least one tension resisting member is situated substantially coaxially with a respective compression resisting member of said at least one compression resisting member and substantially coaxially with a respective said aperture axis in said installed orientation.

10. The system for supporting a load across a plurality of non-intersecting beams as recited in claim 5 wherein each said respective crossing member includes a substantially rectangular structure depending from said integral support expanse; said substantially rectangular structure effecting said substantially nesting orientation with said channel structure.

11. The system for supporting a load across a plurality of non-intersecting beams as recited in claim 10 wherein each said respective crossing member has a respective length and wherein a dimension from said top surface of a respective crossing member to the opposing bottom limit of said substantially rectangular structure is substantially constant along said respective length.

12. A system for supporting a load across a plurality of non-intersecting beams; each respective beam of said plurality of non-intersecting beams having a web depending from an upper chord; said upper chord presenting an upper surface generally parallel with a chordal plane; the system comprising:

at least one crossing member intersecting said plurality of non-intersecting beams at a plurality of intersection loci;

at each respective intersection locus of said plurality of intersection loci said respective non-intersecting beam presenting a channel structure configured for receiving a respective crossing member of said at least one crossing member in a substantially nesting orientation when said respective non-intersecting beam and said respective crossing member are in an installed orientation;

each said respective crossing member having a length and a width; each said respective crossing member presenting a substantially planar top surface substantially along said length and said width;

said respective crossing member including an integral support expanse configured for a substantially nestingly abutting relation with said upper chord to present said upper surface of said respective non-intersecting beam and said top surface of said respective crossing member in a substantially coplanar relation in said installed orientation;

said respective non-intersecting beam and said respective crossing member having a plurality of aperture-pairs in substantial register in said installed orientation; each respective aperture-pair of said plurality of aperture-pairs being oriented about a respective axis generally parallel with said chordal plane;

said plurality of aperture-pairs accommodating at least one tension resisting member coupled with said upper chord and traversing said respective crossing member for resisting tension forces on said upper chord in said installed orientation;

said plurality of aperture-pairs accommodating at least one compression resisting member coupled with said upper chord and traversing said respective crossing member within said channel structure for resisting compression forces on said upper chord in said installed orientation.

13. The system for supporting a load across a plurality of non-intersecting beams as recited in claim 12 wherein the system further comprises a plurality of shear resisting members coupling said respective crossing member with said respective non-intersecting beam through said integral support expanse in said installed orientation.

14. The system for supporting a load across a plurality of non-intersecting beams as recited in claim 12 wherein at least one selected tension resisting member of said at least one tension resisting member is situated substantially coaxially with a respective compression resisting member of said at least one compression resisting member and substantially coaxially with a respective said aperture axis in said installed orientation.

15. The system for supporting a load across a plurality of non-intersecting beams as recited in claim 13 wherein at least one selected tension resisting member of said at least one tension resisting member is situated substantially coaxially with a respective compression resisting member of said at least one compression resisting member and substantially coaxially with a respective said aperture axis in said installed orientation.

16. A method for supporting a load across a plurality of non-intersecting beams; each respective beam of said plurality of non-intersecting beams having a web depending from an upper chord; said upper chord presenting an upper surface generally parallel with a chordal plane; the method comprising:

(a) providing at least one crossing member intersecting said plurality of non-intersecting beams at a plurality of intersection loci; each said respective crossing member having a length and a width; each said respective crossing member presenting a substantially planar top surface substantially along said length and said width;

(b) providing a channel structure in said respective non-intersecting beam at each respective intersection locus of said plurality of intersection loci; each respective said channel structure being configured for receiving a respective said crossing member in a substantially nesting orientation when said respective non-intersecting beam and said respective crossing member are in an installed orientation;

(c) providing an integral support expanse with each said respective crossing member; said integral support expanse being configured for a substantially nestingly abutting relation with said upper chord to present said upper surface of said respective non-intersecting beam substantially coplanar with said top surface of said respective crossing member at each said respective intersection locus in said installed orientation; and (d) providing at least one tension resisting member coupled with said upper chord and traversing said respective crossing member for resisting tension forces on said upper chord in said installed orientation.

17. The method for supporting a load across a plurality of non-intersecting beams as recited in claim 16 wherein the method further comprises:

(e) providing a plurality of shear resisting members coupling said respective crossing member with said respective non-intersecting beam through said integral support expanse in said installed orientation.

18. The method for supporting a load across a plurality of non-intersecting beams as recited in claim 17 wherein at least one selected tension resisting member of said at least one tension resisting member is situated substantially coaxially with a respective compression resisting member of said at least one compression resisting member and substantially coaxially with a respective said aperture axis in said installed orientation.

19. The method for supporting a load across a plurality of non-intersecting beams as recited in claim 18 wherein each said respective crossing member includes a substantially rectangular structure depending from said integral support expanse; said substantially rectangular structure effecting said substantially nesting orientation with said channel structure; and wherein each said respective crossing member has a respective length and wherein a dimension from said top surface of a respective crossing member to the opposing bottom limit of said substantially rectangular structure is substantially constant along said respective length.

\* \* \* \* \*